United States Patent Office.

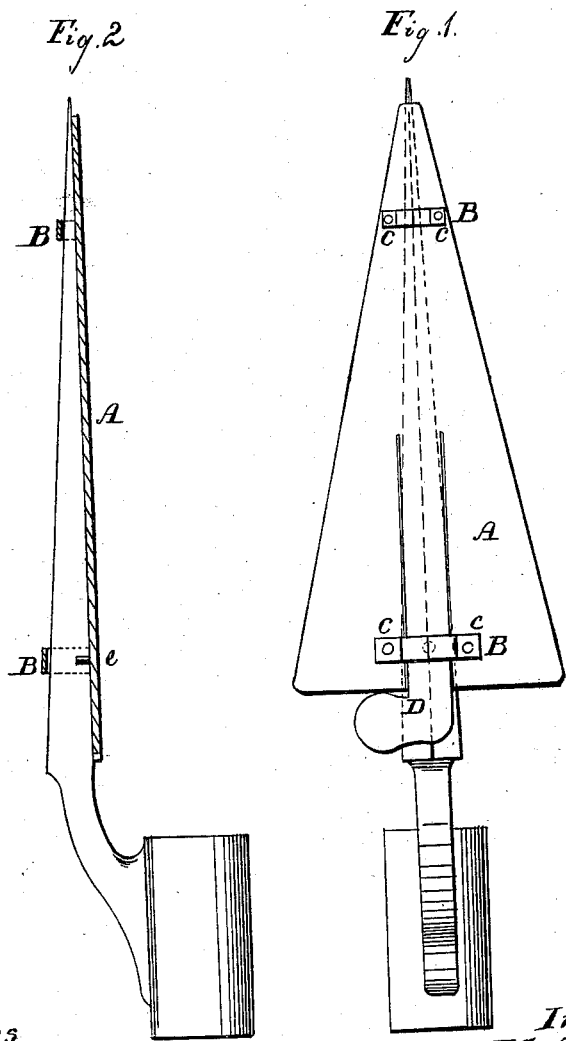

JOHN S. ALEXANDER, OF PHILADELPHIA, PENNSYLVANIA.

Letters Patent No. 91,586, dated June 22, 1869.

IMPROVEMENT IN SPADE-BAYONETS.

The Schedule referred to in these Letters Patent and making part of the same.

*To all whom it may concern:*

Be it known that I, JOHN S. ALEXANDER, of Philadelphia, in the county of Philadelphia, and State of Pennsylvania, have invented a new and useful Improvement in Bayonet-Attachment; and I do hereby declare that the following is a full, clear, and exact description thereof, which will enable others skilled in the art to make and use the same, reference being had to the accompanying drawings, forming part of this specification.

This invention relates to a new and useful attachment to fire-arm bayonets, and is intended to facilitate the operation of soldiers in throwing up intrenchments or excavating the earth for other purposes, and for all purposes to which an attachment to the bayonet may be applied.

The invention consists in attaching a blade, of any form and size, to the bayonet, by a spring, as hereinafter described.

In the accompanying drawing—

Figure 1 is a top or plan view of an implement designed for digging or excavating the earth, and throwing up intrenchments or breastworks.

Figure 2 is a vertical longitudinal section of the same.

Similar letters of reference indicate corresponding parts.

In this example of my invention, a thin triangular blade is shown, attached to the bayonet, which latter is shown in red color.

On the face, or side of the blade, A, are straps B B, which are made to conform in shape (between the rivets *c c*) with the cross-section of the bayonet, so that the bayonet may be passed through them, as seen in the drawing.

The blade A is provided with a spring, D, either formed directly from the blade or attached thereto, which spring has a projecting pin, *e*, seen in fig. 2, which enters a hole, made for the purpose, in the bayonet.

In this manner, the bayonet is prevented from slipping from the straps, and is held fast on the blade, forming a stiff rib or brace, for strengthening it, thus rendering the blade useful for all the purposes for which it is intended.

It will be seen that the implement may be readily detached, and carried in the knapsack, or otherwise transported. Being made of thin sheet-steel, the weight and bulk would be slight, compared with that of the shovel ordinarily used for intrenching-purposes.

In all the different forms of implements which it may be desired to attach, it will be observed that the bayonet itself is a main support, forming the handle, and rendering a thin or light attachment, in any desired form, effective for many purposes.

Having thus described my invention,

I claim as new, and desire to secure by Letters Patent—

The blade A, constructed as described, and adapted to be attached to a bayonet, in the manner herein set forth, for the purpose specified.

The above specification of my invention signed by me, this 8th day of January, 1869.

JNO. S. ALEXANDER.

Witnesses:
FRANK BLOCKLEY,
ALEX. F. ROBERTS.